(12) United States Patent
Fan et al.

(10) Patent No.: US 6,702,959 B2
(45) Date of Patent: Mar. 9, 2004

(54) LONG LIFE, WHITE LIGHT EMITTING ELECTROLUMINESCENT PHOSPHOR

(75) Inventors: Chen-Wen Fan, Sayre, PA (US); Richard G. W. Gingerich, Towanda, PA (US)

(73) Assignee: Osram Sylvania Inc., Danvers, MA (US)

( * ) Notice: Subject to any disclaimer, the term of this patent is extended or adjusted under 35 U.S.C. 154(b) by 69 days.

(21) Appl. No.: 10/171,737

(22) Filed: Jun. 14, 2002

(65) Prior Publication Data

US 2003/0230741 A1 Dec. 18, 2003

Related U.S. Application Data

(60) Continuation-in-part of application No. 10/110,982, filed on Sep. 16, 2002, which is a division of application No. PCT/US00/31216, filed on Nov. 15, 2000.

(51) Int. Cl.$^7$ .......................... C09K 11/51; C09K 11/54; H05B 33/14
(52) U.S. Cl. ................... 252/301.65; 252/301.4 R; 252/301.4 S; 252/301.4 P; 252/301.4 F; 252/301.4 H; 252/301.5; 252/301.6 R; 252/301.6 P; 252/301.6 F; 313/503
(58) Field of Search .................. 313/503; 252/301.4 R, 252/301.4 S, 301.4 P, 301.4 H, 301.5, 304.6 R, 301.6 S, 301.6 P, 301.6 F

(56) References Cited

U.S. PATENT DOCUMENTS

| | | | | |
|---|---|---|---|---|
| 4,585,673 A | 4/1986 | Sigai | ........................... | 427/213 |
| 4,825,124 A | 4/1989 | Sigai | ........................... | 313/486 |
| 5,080,928 A | 1/1992 | Klinedinst et al. | ............. | 427/70 |
| 5,196,234 A | 3/1993 | Taubner et al. | .............. | 427/213 |
| 5,602,445 A | 2/1997 | Solanki et al. | ............... | 313/503 |
| 5,605,867 A | 2/1997 | Sato et al. | ................... | 437/235 |
| 6,309,700 B1 | 10/2001 | Fan et al. | .................... | 427/213 |

*Primary Examiner*—C. Melissa Koslow
(74) *Attorney, Agent, or Firm*—Robert F. Clark

(57) ABSTRACT

A long-life, white-emitting phosphor blend is provided which comprises about 75 wt. % of a first electroluminescent phosphor having an x color coordinate of about 0.530 and a y color coordinate of about 0.455; about 10 wt. % of a second electroluminescent phosphor having an x color coordinate of about 0.185 and a y color coordinate of about 0.440, said second electroluminescent phosphor containing about 600 ppm copper; and about 15 wt. % of a third electroluminescent phosphor having an x color coordinate of about 0.160 and a y color coordinate of about 0.175, said third electroluminescent phosphor containing about 300 ppm copper.

9 Claims, No Drawings

LONG LIFE, WHITE LIGHT EMITTING ELECTROLUMINESCENT PHOSPHOR

CROSS REFERENCE TO RELATED APPLICATION

This application is a continuation-in-part of application Ser. No. 10/110,982, filed Sep. 16, 2002, which is a 35 USC 371 application of PCT/US00/31216, filed Nov. 15, 2000, which is incorporated herein by reference.

TECHNICAL FIELD

This invention relates to phosphors and more particularly to electroluminescent phosphors. Still more particularly, it relates to a process for improving the half-life of such phosphors and particularly, such phosphors that emit white light.

BACKGROUND ART

Phosphors are a known class of materials that emit electromagnetic radiation in response to stimulation by a form of energy. Generally, the emission of the phosphors is in the visible region of the spectrum. These phosphors are delineated by the form of energy to which they are susceptible, thus: cathode ray tube phosphors are stimulated to emission by impingement of electrons; photoluminescent phosphors are stimulated to emission by actinic radiation; x-ray phosphors are stimulated to emission by the impingement of x-rays; and electroluminescent (hereinafter, EL) phosphors are stimulated to emission by placement in an electric field. It is the latter type of material to which this invention is directed, particularly such phosphors based on ZnS and activated with one or more other materials such as Mn, Cu and/or Cl.

EL phosphors have many commercial uses such as for LCD backlights, copy machines, automotive dashboard displays, nightlights, control switch illumination, emergency lighting, watch dials, etc. These phosphors individually have emission colors ranging from orange-yellow through green to greenish-blue and blue.

It is known to combine at least three such phosphors to make a material that will emit white light; however, the half-life of the white-emitting phosphor blends is not great, only about 700 hours. Since half-life is important in commercial applications of EL phosphors, it would be advantageous to provide a white-emitting phosphor blend having a longer half-life.

SUMMARY OF THE INVENTION

It is, therefore, an object of the invention to obviate the disadvantages of the prior art.

It is another object of the invention to enhance the half-life of white emitting electroluminescent phosphors.

These objects are accomplished, in one aspect of the invention, by providing a phosphor blend comprising about 75 wt. % of a first electroluminescent phosphor having an x color coordinate of about 0.530 and a y color coordinate of about 0.455; about 10 wt. % of a second electroluminescent phosphor having an x color coordinate of about 0.185 and a y color coordinate of about 0.440, said second electroluminescent phosphor containing about 600 ppm copper; and about 15 wt. % of a third electroluminescent phosphor having an x color coordinate of about 0.160 and a y color coordinate of about 0.175, said third electroluminescent phosphor containing about 300 ppm copper.

This phosphor blend, when incorporated into an electroluminescent lamp, and energized by a suitable alternating current electric field, emits white light having an x color coordinate of from about 0.325 to about 0.335 and a y color coordinate of from about 0.355 to about 0.360. Further, the half-life of the phosphor is greater than about 750 hours, and more preferably greater than about 1000 hours.

DETAILED DESCRIPTION OF THE INVENTION

For a better understanding of the present invention, together with other and further objects, advantages and capabilities thereof, reference is made to the following disclosure and appended claims.

To prepare the blends of white-emitting EL phosphors, eight different lots of coated EL phosphors with various emission colors and coating thicknesses were selected and lamps were made and tested. The results are listed in Table I. As used herein, the half-life of the phosphor or phosphor blend is defined as that period of time necessary for the light output of the energized phosphor or phosphor blend to decrease to one-half of its initial light output. The initial light output of the phosphor or phosphor blend is measured immediately after the first 24 hours of operation. Emission colors are represented in terms of C.I.E. x,y color coordinates.

All of the starting phosphor materials employed herein were provided with a moisture-inhibiting coating comprising a mixture of aluminum oxide hydroxide, AlO(OH), and aluminum trihydroxide, $Al(OH)_3$, via chemical vapor deposition by a process using trimethyl aluminum and an oxygen/ozone reactant. Such a process is described in U.S. Pat. No. 6,309,700 which is incorporated herein by reference. Those starting materials having the prefix TNE have a thinner coating layer, as evidenced by the lesser aluminum amounts shown in Table III.

TABLE I

| Sample | | Emission Color | | Light Output | | | Half | Efficacy |
| --- | --- | --- | --- | --- | --- | --- | --- | --- |
| No. | Type | x | y | 2 HR | 24 HR | 100 HR | Life | 1 m/watt |
| TH77 | TNE100 | 0.531 | 0.453 | 7.8 | 8.0 | 6.8 | 900 | 2.4 |
| TH46 | TNE300 | 0.185 | 0.438 | 24.7 | 22.3 | 20.4 | 1200 | 5.3 |
| TH53 | TNE600 | 0.157 | 0.177 | 11.0 | 9.2 | 6.9 | 213 | 3.3 |
| TH92 | TNE600M | 0.166 | 0.225 | 12.4 | 12.7 | 11.8 | 804 | 2.6 |
| TH39 | NE100 | 0.529 | 0.455 | 7.2 | 7.2 | 6.8 | 900 | 3.3 |
| TH30 | NE300 | 0.184 | 0.436 | 18.5 | 18.8 | 18.0 | 1200 | 6.3 |
| TH36 | NE600 | 0.157 | 0.175 | 8.5 | 8.0 | 6.3 | 288 | 3.6 |
| TH93 | NE600M | 0.164 | 0.211 | 10.2 | 10.8 | 10.2 | ~1295 | 2.8 |

Four white-emitting EL samples were prepared by blending about 75 wt. % of a TNE or NE 100 (ZnS:Cu,Mn), about 10 wt. % of a TNE or NE300 (ZnS:Cu containing about 600 ppm Cu) and about 15 wt. % of a TNE or NE600 or 600M (ZnS:Cu containing about 300 ppm Cu). The TNE600M and the NE600M differ from the other '600' families of phosphors by the process of making them, such process being described in pending U.S. patent application Ser. No. 10/110,982, filed Apr. 19, 2002, the teachings of which are incorporated by reference.

The four compositions are designated in Table II as TH 82, TH82M, TH45 and TH45M.

TABLE II

| Sample No. | Type | Composition | | | |
|---|---|---|---|---|---|
| | | TH82 | TH82M | TH45 | TH45M |
| TH77 | TNE100 | 7.3 kg | 730 g | — | — |
| TH46 | TNE300 | 1.2 kg | 120 g | — | — |
| TH53 | TNE600 | 1.5 kg | — | — | — |
| TH92 | TNE600M | — | 150 g | — | — |
| TH39 | NE100 | — | — | 7.3 kg | 730 g |
| TH30 | NE300 | — | — | 1.2 kg | 120 g |
| TH36 | NE600 | — | — | 1.5 kg | — |
| TH93 | NE600M | — | — | — | 150 g |

The four compositions shown in Table II were incorporated into EL test lamps which were operated at 100 V and 400 Hz in a 50% R.H, 70° F. environment. The EL test lamps were standard thick film devices comprised of a ~40 μm-thick phosphor layer and a ~16 μm-thick barium titanate dielectric layer. The lamps are constructed by combining the phosphor with a cyanoresin binder (Shin Etsu Co.) which has been dissolved in a mixture acetone and dimethylformamide. The phosphor suspension is blade coated onto a 0.007 in.-thick PET film having a transparent, conductive layer of indium-tin oxide (ITO) (available from Southwall Technologies Corp.). After drying, the barium titanate layer is applied over the phosphor layer in the same way using a suspension of barium titantate dispersed in the cyanoresin binder. A rear electrode comprised of a 70 to 95 μm-thick graphite layer is applied to the dried barium titanate dielectric layer using a graphite suspension (Acheson Colloids). Lead wires are attached and the entire lamp is laminated with a clear, flexible polyester film (Naplam I from General Binding Corp.) which is applied to both sides.

The results of the lamp tests are shown in Table III wherein the control material is labeled CJ44. This latter material was encapsulated with an aluminum oxide hydroxide coating by employing a prior art process using trimethyl aluminum and water vapor.

TABLE III

| Composition No. | Al Wt. % | Emission Color | | Light Output (Foot Lamberts) | | | Half Life | Efficacy 1 m/watt |
|---|---|---|---|---|---|---|---|---|
| | | x | y | 2 Hr. | 24 Hr. | 100 Hr. | | |
| TH82 | 2.7 | 0.329 | 0.360 | 11.3 | 10.8 | 9.4 | 760 | 2.5 |
| TH45 | 3.9 | 0.335 | 0.358 | 9.6 | 9.2 | 8.2 | 953 | 2.7 |
| TH82M | 2.7 | 0.330 | 0.356 | 11.9 | 11.8 | 10.7 | 879 | 2.8 |
| TH45M | 3.8 | 0.327 | 0.357 | 10.0 | 10.0 | 9.7 | 1475 | 3.0 |
| CJ44 | 3.9 | 0.329 | 0.363 | 9.6 | 9.1 | 7.8 | 704 | 2.0 |

These data show that a white-emitting blend made with a blue-emitting phosphor having just about 300 ppm copper (i.e., the '600' series materials), together with the yellow-orange-emitting phosphor which includes copper and manganese and the green-emitting phosphor containing copper in an amount of about 600 ppm (i.e., the '300' series materials), provides greatly increased brightness, higher efficacies and longer life than that provided by the standard white-emitting blend, CJ44.

As can be seen from Table III the half-life of the white-emitting phosphor blend was enhanced by at least about 10% over the standard type CJ44. Most importantly, the half life of composition no. TH45M was measured as 1475 hours. This is more than two times the half life of the previous standard. Additionally, the efficacy of TH45M was measured as 3.0 lumens/watt, which is 50% higher than the standard CJ 44.

While there have been shown and described what are at present considered to be the preferred embodiments of the invention, it will be apparent to those skilled in the art that various changes and modification can be made herein without departing from the scope of the invention as defined by the appended claims.

what is claimed is:

1. A phosphor blend comprising:
   about 75 wt. % of a first electroluminescent phosphor having an x color coordinate of about 0.530 and a y color coordinate of about 0.455;
   about 10 wt. % of a second electroluminescent phosphor having an x color coordinate of about 0.185 and a y color coordinate of about 0.440, said second electroluminescent phosphor containing about 600 ppm copper; and
   about 15 wt. % of a third electroluminescent phosphor having an x color coordinate of about 0.160 and a y color coordinate of about 0.175, said third electroluminescent phosphor containing about 300 ppm copper.

2. The phosphor blend of claim 1 wherein said blend has an x color coordinate of from about 0.325 to about 0.335 and a y color coordinate of from about 0.355 to about 0.360.

3. The phosphor blend of claim 1 wherein said first electroluminescent phosphor is ZnS:Cu,Mn.

4. The phosphor blend of claim 1 wherein said second phosphor is ZnS:Cu.

5. The phosphor blend of claim 1 wherein said third phosphor is ZnS:Cu.

6. The phosphor blend of claim 2 wherein said blend has a half-life of between 760 and 1475 hours.

7. The phosphor blend of claim 2 wherein said blend has a half-life of greater than about 750 hours.

8. The phosphor blend of claim 2 wherein said blend has a half-life of greater than about 1000 hours.

9. The phosphor blend of claim 8 wherein the first phosphor is ZnS:Cu,Mn, the second phosphor is ZnS:Cu, and the third phosphor is ZnS:Cu.

* * * * *